(12) United States Patent
Cremaschi

(10) Patent No.: US 11,358,094 B2
(45) Date of Patent: Jun. 14, 2022

(54) ELECTROSPRAY VORTICAL FLOW EXCHANGER

(71) Applicant: AUBURN UNIVERSITY, Auburn, AL (US)

(72) Inventor: Lorenzo Cremaschi, Auburn, AL (US)

(73) Assignee: AUBURN UNIVERSITY, Auburn, AL (US)

( * ) Notice: Subject to any disclaimer, the term of this patent is extended or adjusted under 35 U.S.C. 154(b) by 0 days.

(21) Appl. No.: 17/034,344

(22) Filed: Sep. 28, 2020

(65) Prior Publication Data

US 2021/0093996 A1    Apr. 1, 2021

Related U.S. Application Data

(60) Provisional application No. 62/906,913, filed on Sep. 27, 2019.

(51) Int. Cl.
*B01D 53/30* (2006.01)
*B01D 45/16* (2006.01)
(Continued)

(52) U.S. Cl.
CPC ........... *B01D 53/323* (2013.01); *B01D 45/16* (2013.01); *B01D 53/263* (2013.01); *B04C 5/103* (2013.01);
(Continued)

(58) Field of Classification Search
CPC ..... B01D 53/323; B01D 45/16; B01D 53/263
See application file for complete search history.

(56) References Cited

U.S. PATENT DOCUMENTS 2,207,576 A * 7/1940 Brown ...................... B03C 3/16
                                                                95/71
4,398,928 A * 8/1983 Kunsagi .................... B04C 9/00
                                                                239/504
(Continued)

FOREIGN PATENT DOCUMENTS

CN    205850480 U    1/2017
CN    107511273 A    12/2017
(Continued)

OTHER PUBLICATIONS

International Search Report and Written Opinion of the International Searching Authority issued for PCT/US2020/053038; dated Dec. 3, 2020.
(Continued)

*Primary Examiner* — Robert A Hopkins
(74) *Attorney, Agent, or Firm* — Barnes & Thornburg LLP

(57) ABSTRACT

An air conditioning device includes a body comprising an inlet plenum portion to receive input air including vapor molecules, a spray chamber portion to receive the input air, the received input air being rigorously mixed within the spray chamber, a sprayer portion to charge a liquid droplet and to release the charged liquid droplet into the rigorously mixed air to cause the charged liquid droplet to attract a vapor molecule, such that the vapor molecule attaches to the charged liquid droplet and separates from the input air, a separation chamber portion to cause the liquid droplet with the attached vapor molecule to separate from the rigorously mixed air and to condense and collect as liquid within an outlet plenum, and an air outlet portion to direct output air from the air conditioning device, a first humidity of the output air being less than a second humidity of the input air.

17 Claims, 3 Drawing Sheets

(51) Int. Cl.
  *B01D 53/32* (2006.01)
  *B01D 53/26* (2006.01)
  *B04C 5/103* (2006.01)
  *B04C 9/00* (2006.01)
  *F24F 3/14* (2006.01)

(52) U.S. Cl.
  CPC .............. *B04C 9/00* (2013.01); *F24F 3/14* (2013.01); *B04C 2009/001* (2013.01); *B04C 2009/008* (2013.01); *F24F 2003/1446* (2013.01)

(56) References Cited

U.S. PATENT DOCUMENTS

| | | |
|---|---|---|
| 4,734,109 A | 3/1988 | Cox et al. |
| 5,766,314 A | 6/1998 | Weber et al. |

FOREIGN PATENT DOCUMENTS

| | | |
|---|---|---|
| DE | 2355038 A1 | 5/1975 |
| DE | 4303256 A1 | 8/1994 |
| KR | 20190098286 A | 8/2019 |
| WO | 2010/008336 | 1/2010 |

OTHER PUBLICATIONS

"Dehumidification using Negative corona Discharge from a Water Droplet," Yoshio Higashiyama, et al. Proc. 2017 Annual Meeting of Electrostatics of America (7 pages).

"Electrically Enhanced Condensation I: Effects of Corona Discharge," Michael Reznikov, IEEE Transactions on Industry Applications, vol. 51, No. 2, Mar./Apr. 2015 (9 pages).

"Electrically Enhanced Condensation II: Effects of the Electrospray," Matthew Salazar et al. IEEE Transactions on Industry Applications, vol. 51, No. 2, Mar./Apr. 2015 (7 pages).

"Further Progress in the Electrostatic Nucleation of Water Vapor," Michael Reznikov et al. IEEE Transactions on Industry Applications, vol. 54, No. 1, Jan./Feb. 2018 (8 pages).

\* cited by examiner

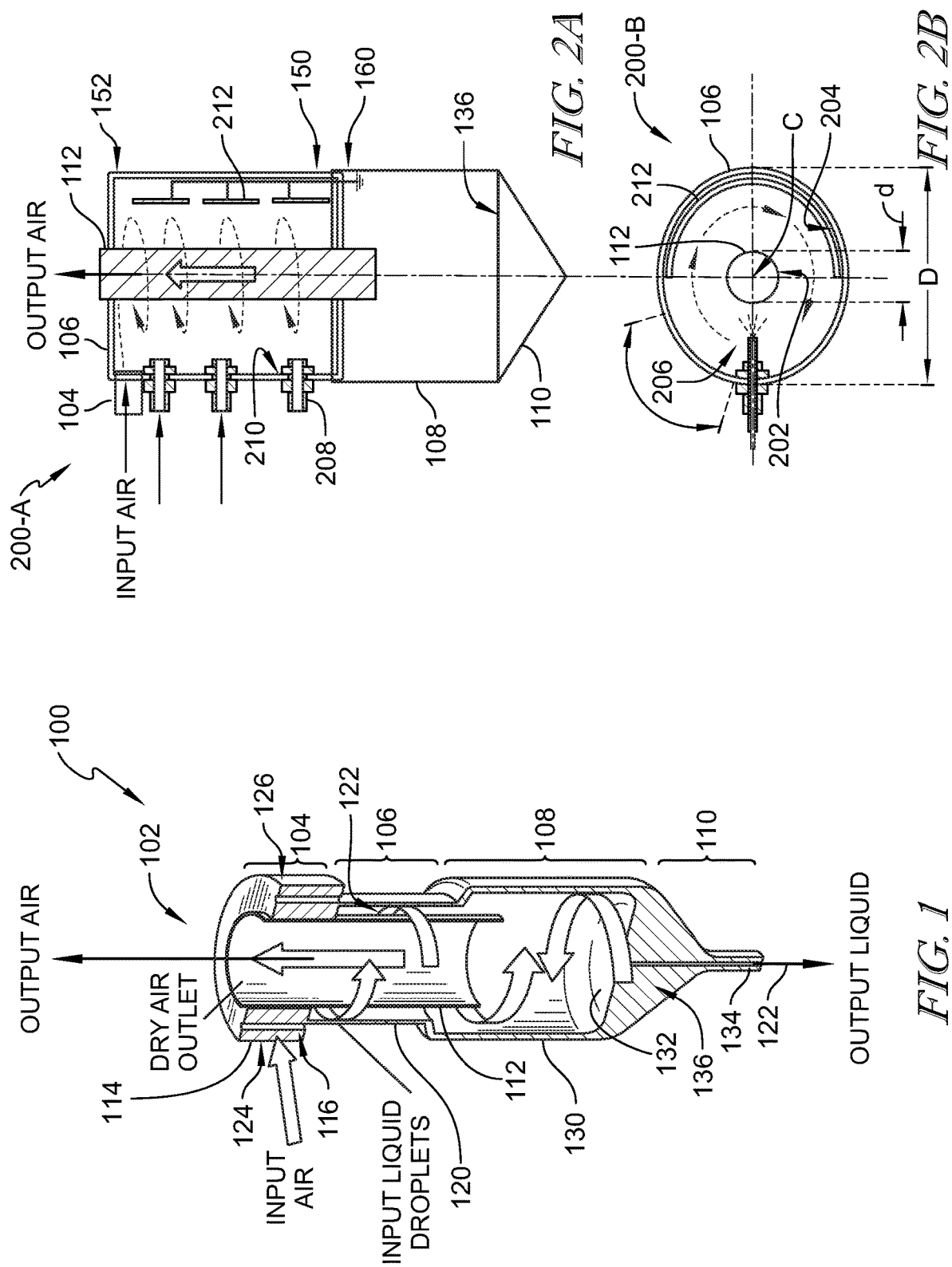

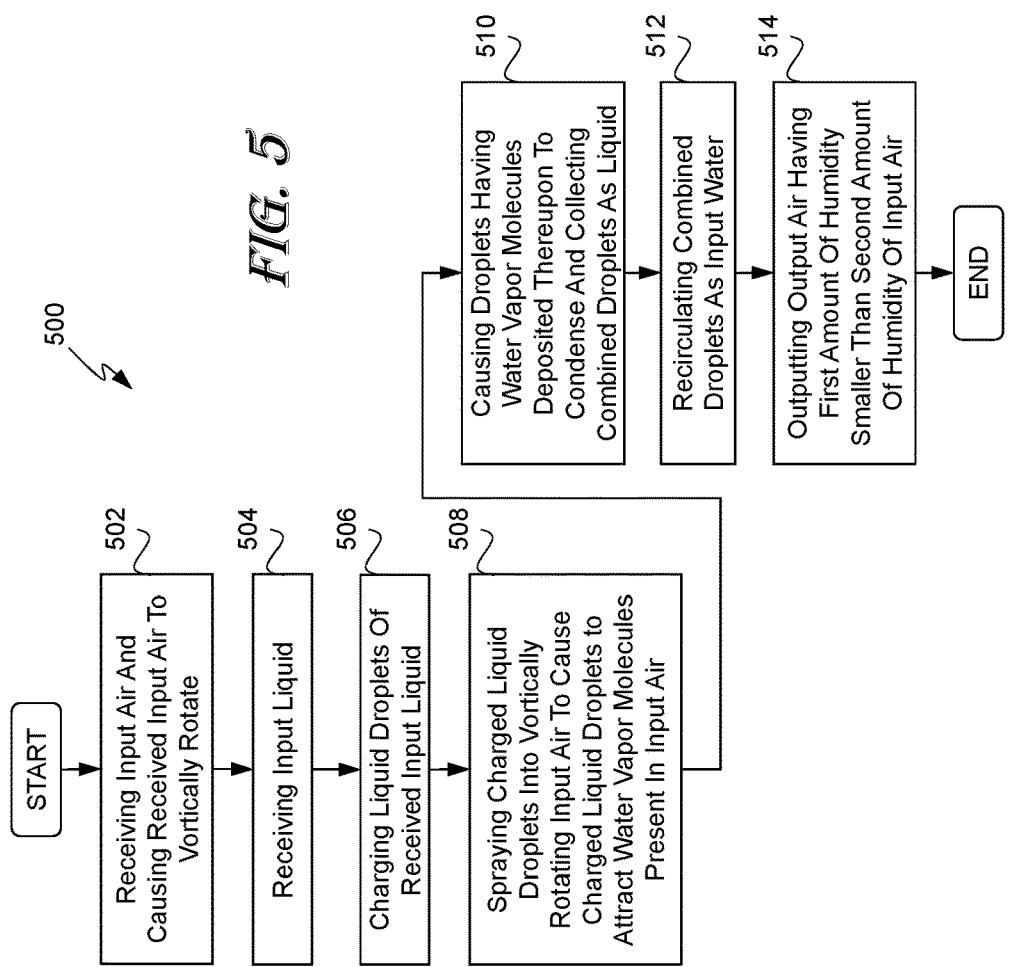
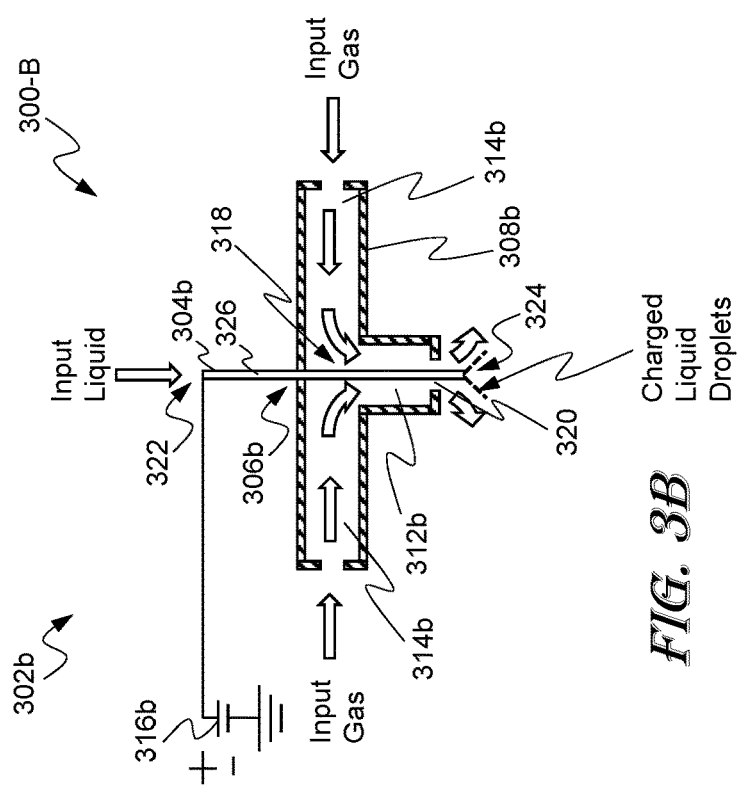

ELECTROSPRAY VORTICAL FLOW EXCHANGER

CROSS-REFERENCE TO RELATED APPLICATIONS

This application claims priority under 35 U.S.C. § 119(e) to U.S. Provisional Application No. 62/906,913, filed Sep. 27, 2019, which is expressly incorporated by reference herein in its entirety.

TECHNICAL FIELD

The present disclosure generally relates to methods and systems for air dehumidification, separation and filtration.

BACKGROUND

Air conditioning, dehumidification, and purification systems may be based on different principles of science and engineering, such as thermodynamics and heat transfer. An example system may include a fan, an air conditioner, and heat exchange coils, where the fan moves air past extremely cold heat exchange coils causing moisture present in the air to condense and collect on the coils, thereby removing moisture from the air. As another example, a ventilating system may include a sensor and an exhaust fan and may expel air from basements, attics, and crawlspaces. Certain types of air processing and conditioning system rely on hydrophilic materials in a form of single-use desiccant-type cartridges, gel, or powder.

High-efficiency cooling and heating systems conserve energy, lower utility costs, and heat and cool a given interior space more effectively. Energy ratings such as, a seasonal energy efficiency ratio (SEER) for air conditioners, indicate an amount of energy used by a given unit to bring interior temperature to a desired level.

SUMMARY

An air conditioning device includes a body comprising an inlet plenum portion configured to receive input air including vapor molecules, a spray chamber portion operatively connected with the inlet plenum portion and configured to receive the input air therefrom, wherein the received input air is rigorously mixed within the spray chamber, a sprayer portion configured to charge at least one of a plurality of liquid droplets generating at least one charged liquid droplet, wherein the sprayer portion is operatively connected with the spray chamber portion and is configured to release the charged liquid droplet into the rigorously mixed air to cause the charged liquid droplet to attract at least one vapor molecule, such that the at least one vapor molecule attaches to the charged liquid droplet and separates from the input air, a separation chamber portion operatively coupled to the spray chamber portion and an outlet plenum portion, wherein the separation chamber portion causes the liquid droplet with the attached vapor molecule to separate from the rigorously mixed air and to condense and collect as liquid within the outlet plenum, and an air outlet portion operatively coupled to the separation chamber and configured to direct output air away from the air conditioning device, wherein the output air includes air remaining following the separation, from the rigorously mixed air, of the liquid droplet with the attached vapor molecule, and wherein a first humidity of the output air is less than a second humidity of the input air.

A method for operating an air conditioning device includes receiving input air including vapor molecules and moving the received input air in an air rotating vortex, charging at least one of a plurality of liquid droplets to generate at least one charged liquid droplet, releasing the charged liquid droplet into the air rotating vortex to cause the charged liquid droplet to attract at least one vapor molecule, such that the at least one vapor molecule attaches to the charged liquid droplet and separates from the input air, causing the liquid droplet with the attached vapor molecule to separate from the air rotating vortex and to condense and collect within an outlet plenum, and directing output air away from the air conditioning device, wherein the output air includes air remaining following the separation, from the air rotating vortex, of the liquid droplet with the attached vapor molecule, and wherein a first humidity of the output air is less than a second humidity of the input air.

An air conditioning device includes a spray chamber configured to receive input air including vapor molecules, wherein an air rotating vortex within the spray chamber moves the received input air, an electrospray configured to charge liquid droplets and release the charged liquid droplets into the air rotating vortex causing the charged liquid droplet to attract at least one vapor molecule, such that the at least one vapor molecule attaches to the charged liquid droplet, a separation chamber configured to cause the liquid droplet with the attached vapor molecule to separate from the air rotating vortex and to condense and collect as liquid within an outlet plenum, and an air outlet configured to direct output air away from the air conditioning device, wherein the output air includes air remaining following the separation, and wherein at least one of (i) a first humidity of the output air is less than a second humidity of the input air and (ii) a first temperature of the output air is less than a second temperature of the input air.

BRIEF DESCRIPTION OF THE DRAWINGS

The detailed description particularly refers to the following figures, in which:

FIG. 1 is a block diagram illustrating a perspective cross-section view of an air conditioning device of the present disclosure;

FIG. 2A is a block diagram illustrating a front cross-section view of the air conditioning device of FIG. 1;

FIG. 2B is a block diagram illustrating a top cross-section view of the air conditioning device of FIG. 1;

FIGS. 3A and 3B are block diagrams illustrating side cross-section views of example implementations of a spray system of the air conditioning device of FIGS. 1, 2A, and 2B;

FIG. 5 is a block diagram illustrating an exemplary process flow for processing air using integration of electrospray and rigorous mixing, such as vortex flow.

DETAILED DESCRIPTION

Figure 4:
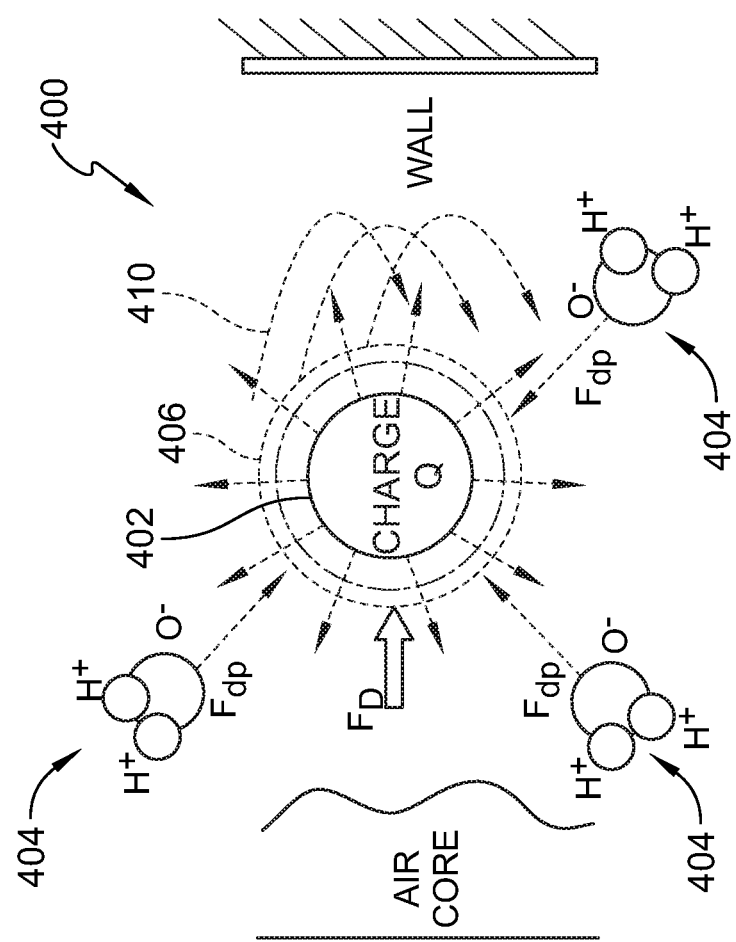
FIG. 4 is a block diagram illustrating an interaction between a charged liquid droplet and vapor molecules.

While the concepts of the present disclosure are susceptible to various modifications and alternative forms, specific exemplary embodiments are been shown by way of example in the drawings and will be described. It should be understood, however, that there is no intent to limit the concepts of the present disclosure to the particular forms disclosed; on the contrary, the intention is to cover all modifications, equivalents, and alternatives falling within the spirit and scope of the invention as defined by the appended claims.

References in the specification to "one embodiment," "an embodiment," "an illustrative embodiment," etc., indicate that the described embodiment may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Marketplace competitiveness of a given device for air processing, conditioning, or purification, such as a heat, ventilation, and A/C (HVAC) system, may be its energy efficiency and price. In addition, the overall size of the HVAC system in residential and light commercial applications is becoming increasingly important. Providing air dehumidification and associated cooling is a main environmental factor penalizing the energy performance of conventional mechanical type vapor compression-based dehumidification systems. However, energy-efficient dehumidification and cooling methods, in particular, have not yet been implemented in commercially viable forms applicable in residential or light commercial settings. As one example, an energy-efficient dehumidification method may be based on the nucleation of polar water molecules or ions, also referred to as dielectrophoresis, where generation of electrostatic attraction force causes an amount of the water vapor condensate to increase. Nevertheless, facilitating an electrostatic-based water vapor separation is made impractical in interior dehumidification given a magnitude of an electric field necessary to displace and remove water droplets from the air flow.

An example air conditioning device of the present disclosure uses electrically charged droplets to attract water vapor molecules from the surrounding air and uses a vortical flow or another rigorous mixing and/or induced movement to separate from the air the droplets made heavier by the attached vapor molecules. Put another way, the example air conditioning device uses electrically charged water droplets in vortically rotating airflows, and/or flows of air or another gas generated by rigorous mixing, spinning, or rotating, attract water vapor and dehumidify and cool the air stream. As such, the air conditioning device of the present disclosure integrates electrospray technology including high voltage corona discharge emitters, such that the high potential voltages are used only to charge the droplets in the electrospray, and the separation is achieved when the droplets move in the microgravity environment subjected to centripetal force. By injecting electrically charged droplets into vortical flows, or other types of flow generated by rigorous mixing spinning, stirring, or rotating, the electrostatic-based water harvesting techniques may be applied to achieve air dehumidification and cooling that are both commercially viable and energy efficient.

As one example, air conditioning device of the present disclosure provides energy savings in view of a significant reduction in humidity (e.g., 20% to 30%) of the entering outdoor air, which reduces the latent loads and increases the dew point evaporating temperatures of the coils. In an example, the unit energy savings (UES) provided by the air conditioning device of the present disclosure over that of a typical dehumidifying technology may depend on a climate zone and may range between 15% to 39%. For a hot and humid climate zone 3, the UES over the typical dehumidifying technology may be approximately 23%.

FIG. 1 illustrates a cross-sectional perspective view of an example air conditioning device 100 in accordance with the present disclosure. FIGS. 2A-2B illustrate a cross-sectional front view 200-A and a top view 200-B of the air conditioning device 100, respectively. A body 102 of the air conditioning device 100 comprises an inlet plenum 104, a spray chamber 106, a separation chamber 108, an outlet plenum 110, and an outlet tube 112. While described as comprising individual subsections and/or components (e.g., chambers, plenum, tube), other implementations of the body 102 of the air conditioning device 100 are also contemplated. For example, it is readily understood that, the body 102 of the air conditioning device 100 may comprise more or fewer portions or subsections arranged in the same or different manner with respect to one another and/or with respect to one or more portions or subsections operatively connected to the device 100. Likewise, the more or fewer and/or differently arranged portions of the body 102 may be moldably integrated with one another, separably assembled, or some combination thereof.

The inlet plenum 104 of the air conditioning device 100 comprises a plurality of walls 114 spaced apart from one another and defining a passage 116 therebetween. The inlet plenum 104 is configured to receive input air and deliver the input air into the air conditioning device 100. For example, the passage 116 may be enclosed, such that input air enters the inlet plenum 104 at a first inlet plenum end 124 and exits the inlet plenum 104 at a second inlet plenum end 126.

The input air may comprise one of outside air, inside air, recirculated air, and previously conditioned air, such as in a multi-stage HVAC system, or some combination thereof. The input air may enter (or be drawn into) the passage 116 of the inlet plenum 104 at a predefined amount of pressure and/or speed to facilitate movement of the input air, e.g., airflow, along a length of the inlet plenum 104. At least a portion of the inlet plenum 104 may extend in a circular or a semicircular manner to surround the spray chamber 106, such that the input air entering the passage 116 travels the length of the inlet plenum 104 in a predefined circular or semicircular arc.

The spray chamber 106 is operatively connected with the inlet plenum 104 and is configured to receive the input air therefrom, e.g., via the second inlet plenum end 126 of the inlet plenum 104. The spray chamber 106 comprises a sidewall 120 shaped as a hollow cylinder. The sidewall 120 defines a plurality of apertures 210, each aperture 210 configured to receive a spray nozzle 208. In one example, the apertures 210 are offset from one another at equal distances and are disposed in a single row along a vertical line perpendicular to a direction of flow of the input air. At least a portion of each spray nozzle 208 protrudes through a corresponding aperture 210 and extends into an inner portion of the sidewall 120, such that the spray nozzle 208 may be configured to selectively deliver liquid into a stream of air flowing inside the spray chamber 106.

The spray nozzles 208 are configured to selectively spray, inject, or otherwise direct a plurality of liquid droplets into the inner portion of the spray chamber 106. As described in reference to at least FIG. 3, the spray nozzles 208 are configured to spray or inject electrically charged liquid droplets into the interior of the spray chamber 106, where the charged liquid droplets mix with the inlet air inside air rotating vortexes, or other flow types generated by rigorous mixing, spinning, stirring, or rotating. More specifically, the charged liquid droplets attract water vapor molecules present in the input air, thereby, removing the humidity from and cooling the input air.

A plurality of electrically grounded c-rings 212 may be used as collectors to measure collector current for a given emitter voltage. The c-rings 212 are disposed within the interior of the spray chamber 106 and along a portion of the sidewall 120 opposite the apertures 210 and the nozzle 208 protruding therethrough. Each c-ring 212 comprises an elongated strip that that extends along, and mimics the shape of, the sidewall 120 of the spray chamber 106. The c-rings 212 are disposed in row directly above and below one another and are offset from one another at equal distances along a vertical axis. In some instances, distances between the c-rings 212 may correspond to those between the apertures 210, such that a center of each c-ring 212 is in a horizontal alignment with a center of the aperture 210 disposed opposite the c-ring 212. As one example, an arc length of each c-ring 212 corresponds to approximately one-half of a circumference of the sidewall 120 of the spray chamber 106. While the air conditioning device 100 is illustrated as generating vortical flow using electrospray and emitter panels, other methodologies are also contemplated. For example, in some instances, the air conditioning device 100 may include a fan configured to supplement the vortex airflow. Furthermore, in some examples, other types of gas flow may be used instead of, or in conjunction with, the vortex airflow, such as flow types generated by self-generated or induced rigorous mixing, spinning, stirring, or rotating.

The separation chamber 108 may be operatively connected with the spray chamber 106, e.g., about a first end 150 of the spray chamber 106 opposite a second end 152 of the spray chamber 106 connected to the inlet plenum 104. (See, e.g., FIGS. 2A-2B.) In one example, the spray chamber 106 and the separation chamber 108 comprise elongated hollow cylindrical bodies having approximately the same diameter with one another, such that the spray chamber 106 and the separation chamber 108 may be operatively connected with one another about respective first ends 150, 160 of the bodies of the chambers 106, 108.

Within the separation chamber 108, the vortical flow cyclone separates largest (heaviest or having a predefined mass greater than a threshold) droplets from the air and causes these droplets to collect on a sidewall 130 of the separation chamber 108. In particular, by applying the vortical flow, the air conditioning device 100 uses collision of the charged droplets during their flight as additional mechanism of water vapor condensation on surfaces of the charged droplets. The attraction of water vapor molecules reduce the initial charge applied to the droplet and coalesce phenomena with other neutral droplets during in-flight trajectory across the vortical flow increases the effective mean radius within which the droplet collects the humidity present in the input air. Accordingly, the air conditioning device 100 eliminates a need for high-magnitude external electrostatic fields necessary to move the charged droplets in the air, when the air moves at airflow speeds exceeding a predefined threshold. The air conditioning device 100 also eliminates a need for a membrane or other cold surfaces that physically condensate and/or remove the water droplets from the air stream.

The droplets may grow as a result of attracting water vapor molecules in microgravity environment. Upon exceeding a predefined size, the droplets may then collect (or pool) 132 at the outlet plenum 110 operatively connected with the separation chamber 108. The outlet plenum 110 may comprise a conical funnel having a round drain opening 134 narrower than a top opening 136 of the outlet plenum 110, such that the droplets that enter the output plenum 110 through the top opening 136 may drain, or otherwise exit, the body 102 of the air conditioning device 100 through the drain opening 134. In some instances, upon exiting the body 102 of the air conditioning device 100, the collected droplets may be recirculated to be sprayed or otherwise released into the spray chamber 106.

Once moisture is removed from the input air, the output air may exit the air conditioning device 100 via the outlet tube 112. The output air may have lower humidity and/or a lower temperature than the input air received by the air conditioning device 100. As illustrated in FIGS. 1 and 2A-2B, the outlet tube 112 may comprise an elongated hollow cylinder disposed within, and concentrically (C) with, a structure of the spray chamber 106 joined with the separation chamber 108. A diameter d of the outlet tube 112 may be smaller than a diameter D of each of the spray chamber 106 and the separation chamber 108, such that an outer surface 202 of the outlet tube 112 wall and an inner portion 204 of the sidewall 120 of the spray chamber 106 define a vortex pathway 206 therebetween. In some instances, relative diameters of the outlet tube 112 and each of the spray chamber 106 and the separation chamber 108 may be such that movement and mutual attraction of the charged liquid droplets sprayed by the nozzles 208 and water vapor molecules of the input air is unimpeded and/or such that vortex speed and pressure support removal of the water vapor molecules from the input air through attachment of the vapor molecules to the charged liquid droplets.

Figure 3A:
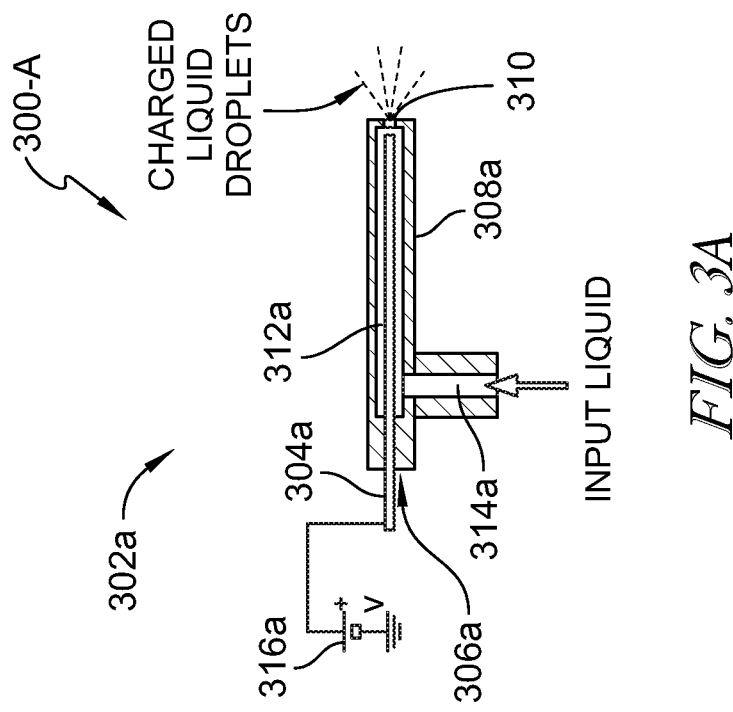

FIGS. 3A-3B illustrate example first and second implementations 300-A and 300-B of a spray system 302 (as illustrated, for example, by elements 302a and 302b) of the air conditioning device 100. In some instances, the spray system 302 may be an electrospray system. As described in reference to at least FIG. 1, optimization of the electrospray system with respect to diameter of the vortical tube prevents re-evaporation of the water droplets as the result of high diffusion at the exit stage of the vortical flow.

The example spray systems 302a, 302b include high-voltage electrodes 304a, 304b and tubular housings 308a, 308b, respectively. As illustrated in FIG. 3A, the electrode 304a is slidably inserted, e.g., using an electrode opening 306a, into the tubular housing 308a and extends along a channel 312a thereof toward a spray opening 310. The tubular housing 308a defines a liquid inlet 314a, which is fluidly interconnected with the channel 312a and through which liquid enters the channel 312a of the tubular housing 308a and is directed toward the spray opening 310. At least a portion of the channel 312a has a height H greater than a height h of the electrode 304a, such that liquid entering the channel 312a via the liquid inlet 314a envelops or surrounds at least a portion of the electrode 304a.

As illustrated in FIG. 3B, the tubular housing 308b may define a pair of gas inlets 314b about opposing ends of the housing 308b, where the gas inlets 314b are configured to receive gases, such as, but not limited to, air, carbon dioxide, or nitrogen. The gas inlets 314b extend longitudinally along the tubular housing 308b and are fluidly interconnected with one another and with a channel 312b at a junction 318. In an example, the channel 312b extends perpendicular to the gas inlets 314b and intersects the gas inlets 314b at the junction 318 to extend toward a discharge opening 320. Accordingly, the gas entering the tubular housing 308b through each of the gas inlets 314b flows through the junction 318 and along the channel 312b of the tubular housing 308b toward the discharge opening 320. The gas stream, such as, for example, air stream, entering the electrospray through the inlets 314b may be a very small fraction of the output drier air from the entire device 102 and may operate to prevent localized corona discharge phenomena at the tip of the needle 324. Alternatively, gases, such as carbon dioxide or nitrogen gases, may be used to prevent localized corona discharge phenomena at the tip of the needle 324 of the electrospray.

The electrode 304b movably inserted into the channel 312b via an electrode opening 306b may extend beyond the tubular housing 308b toward interior of the spray chamber 106. The electrode 304b may define an electrode intake opening 322 and an electrode sprayer 324 about opposing ends of the electrode 304b and connected with one another via a passage 324 interior to the electrode 304b. The electrode 304b may be configured to receive liquid therewithin through the electrode intake opening 322 and expel the liquid via the electrode sprayer 324. At least a portion of the channel 312b has a width W greater than a width w of the electrode 304b, such that air or other gases entering the channel 312b via the gas inlets 314b envelops or surrounds at least a portion of the electrode 304b.

With reference to FIG. 3A, the electrode 304a is operatively connected with a power source 316a and configured to apply electric charge to droplets of the liquid traveling within the channel 312a. Referring now to FIG. 3B, the electrode 304b is operatively connected with a power source 316b and configured to apply electric charge to droplets of the liquid traveling within the passage 326 of the electrode 304b. More specifically, the electrodes 304a, 304b charge electrospray droplets with a predefined electric charge to allow for attraction of an electrically neutral aerosol due to the induced dipole moment. The nucleation and growth of the charged droplets depleted the vapor phase near a droplet, which is compensated by the dielectrophoresis flow and diffusion. In addition, electro-dynamic flow inherently accompanies the dielectrophoresis nucleation due to the presence of electrically charged droplets in high humidity air. The movement of charged droplets through the vapor adds collisions with vapor molecules as well as to the dielectrophoresis drift and diffusion. Both of these effects shift the condensation/evaporation equilibrium toward condensation and, therefore, enhance the collection of vapor compared to the immobilized droplet. However, moving such charged droplets in air required tremendous external electrostatic fields, thereby limiting air flow to very small flows, e.g., in the order of 1 cfm to 2 cfm.

The spray opening 310 of the spray system 302a is configured to spray, inject or otherwise deliver charged liquid droplets to the vortex pathway 206, where the charged liquid droplets mix with the inlet air inside air rotating vortexes. With respect to the spray system 302b, the electrode 304b may expel charged liquid droplets, via the electrode sprayer 324, into the vortex pathway 206, such that the charged liquid droplets mix with the inlet air inside air rotating vortexes. With respect to each of the spray systems 302a and 302b, the charged liquid droplets deposited into the vortexes attract water vapor molecules present in the input air, thereby, removing the humidity from and cooling the input air. Furthermore, as described above, other types of gas flow may be used instead of, or in conjunction with, the vortex airflow, such as flow types generated by self-generated or induced rigorous mixing, spinning, stirring, or rotating.

FIG. 4 illustrates an example diagram 400 of an interaction between a charged liquid droplet 402 and a plurality of vapor molecules 404 present in the input air. The electrical charge a in the liquid droplet 402 increases the tendency of the vapor molecules 404 to deposit themselves onto the liquid droplet 402. More specifically, the electrically charged droplet 402 generates a gradient electric field 406 in the surrounding space. If a water molecule 404 having a predefined dipole momentum $\rho_0$ is placed in a gradient electric field 406 of magnitude E, such a polar molecule 404 experiences a dielectrophoresis force $F_{dp}$ that causes the molecule 404 to move, thereby, producing a gradient of vapor concentration. In one example, the dielectrophoresis force $F_{dp}$ may be described using Equation (1), such that:

$$Fdp = \rho_0 \times g \text{ rad}(E), \tag{1}$$

Amount of energy required to move a water molecule 404 from the surface of a sphere having a radius r to infinity against the dielectrophoresis, i.e., the work of this force from the distance r, generates additional potential energy, $U_{DEP}$, which is given by Equation (2), such that $$U_{DEP} = p_0 q/(4\pi\varepsilon_0 r 2), \tag{2}$$

The saturated vapor pressure $p_R$, near the surface of a charged droplet with radius R, is based on a surface tension, a polarization of vapor near the charged droplet, and the additional potential energy $U_{DEP}$, where the polarization of the vapor is due to the water molecule dipole reorientation, as illustrated, for example, in FIG. 4. Accordingly, the vapor pressure may then be described using Equation (3), such that:

$$p_R = p_C \exp[-\rho_0 q/(4\pi k T R^2)], \tag{3}$$

where $p_C$ is indicative of the saturated vapor pressure according to the Kelvin-Thomson equation, q is indicative of the charge in the nucleation center of radius R (electrically charged ion or droplet), k is indicative of Boltzmann's constant, and T is indicative of absolute temperature. The charge q may be distributed over the surface or over the volume of the droplet, but it affects the electric field outside the droplet similar to the magnitude charge located at the center of droplet.

From Equation (3), the electrical charge q decreases the pressure of the surrounding vapor in equilibrium with the droplet. The decrease in charge may be said to correspond to a decrease in surface tension since the surface tension is caused by an asymmetry of the cohesive forces acting on a molecule on the surface of a liquid droplet and depends on the interaction with the media on the other side of the surface, i.e., air or vapor. Water molecules drift toward the droplet surface due to the dielectrophoresis and a gradient of the vapor concentration occurs.

At steady state, the dielectrophoresis drift and the local diffusion flows are equal; which leads to the classic Maxwell distribution of the vapor concentration. Because dielectrophoresis force moves the vapor 404 toward the droplets 402, a local enrichment of the vapor occurs near the charged droplet. In thermodynamic terms, additional potential energy from the electric charge increases the energy barrier for the molecules to leave the droplet, shifting the equilibrium between evaporation and condensation toward condensation and causing the equilibrium vapor pressure to become smaller than that of a neutral droplet of the same radius, which, in turn, allows for the growth of the droplet at the same vapor pressure. During the growth of charged droplets, the Gibbs free energy diminishes, which means that this process is always favorable as long as the droplet radius remain below the Rayleigh critical radius.

The polarization of vapor near the curved surface of the charged droplet is the result of interfacial polarization of water in the droplet and the vapor near this droplet. For a dielectric sphere α, the polarization may be described as shown in Equation (4), such that:

$$\alpha = 3\varepsilon_0 V_r (\varepsilon - \varepsilon_0)/(\varepsilon + 2\varepsilon_0), \quad (4)$$

and the dielectrophoresis force, $F_{dp}$, acting on such aerosol droplet at distance R from the center of a droplet charge q may be described as shown in Equation (5), such that:

$$F_{dp} = \alpha E g \text{ rad}|E| = 2\alpha q^2/(\varepsilon \varepsilon_0 R^5), \quad (5)$$

where r is indicative of a radius of the sphere α, ε is indicative of dielectric permittivity of the sphere α, and $V_r$ is indicative of volume of the sphere, such that $V_r = 4\pi r^3/3$.

Equation (5) indicates that larger charged droplets collect aerosol at greater distances. Thus, when using ions, the limited charge of the ions as nucleation centers restrict the collection area to few nanometers. When electrospray droplets of micrometer size are used as nucleation centers, they can be initially charged to the Rayleigh limits (that is, to the maximum charge carried by the droplet at which fission occurs) in which the electrostatic forces do not exceed those of surface tension. As such, initially larger droplets (electrospray) collect the vapor more efficiently (over wider area) because they hold more electrical charge.

When the vapor density exceeds the saturation level, a nucleation occurs. The limited charge of ions, which serve as nucleation centers, restrict the equilibrium size of the micro-droplets. However, if electrospray droplets are used as nucleation centers, the droplets can be initially charged to the Rayleigh limit when electrostatic forces do not exceed those of surface tension. The high electric charges decrease the pressure of the vapor, which is in equilibrium with the droplets. Put another way, as result of additional electrical energy, which increases the energy barrier for a molecule to leave a droplet, the evaporation of a charged droplet is suppressed. This shifts the equilibrium between evaporation and condensation toward condensation and thus, allows for the growth of the droplet.

The nucleation and growth of the charged droplets deplete the vapor phase near a droplet, which is compensated for by the dielectrophoresis flow and diffusion. Dielectrophoresis flow involves surrounding vapor at a distance of about 10 nm to 100 nm for droplets charged by an electrospray compared to a distance necessary for a single electron charge in a droplet (e.g., ~2 nm). The electrically charged droplets sweep the air stream in the radial direction. In a 1-g environment, the buoyancy force is describe by the Equation (6), such that $$F_B = V \times \rho_W \times g, \quad (6)$$

where FB is the buoyancy force, V is the volume of the droplet, $\rho_W$ is the water density and g is the gravitational acceleration. In microgravity environment the centripetal acceleration is used to substitute the gravitational acceleration. The resulting solution from Navier-Stoke equations indicates that droplet migrates through a rotating flow and experience a drag force, $F_D$.

The rotating flow does not travel as a uniform body and a discontinuity exists therein. Two distinct layers of flow exist during the separation process: the outer layer is closer to the wall and moves at a greater velocity than the inner layer (extending to the center of the separator). The integration of an electrospray that generates electrically charged small droplets inside the rotating vortex and the growth of these droplets in a microgravity vortical flow environment are new innovations that the present project aims to investigate. Other types of gas flow may be used instead of, or in conjunction with, the vortex airflow, such as flow types generated by self-generated or induced rigorous mixing, spinning, stirring, or rotating.

FIG. 5 illustrates an example process 500 for dehumidifying and cooling air using integration of electrospray and vortical air flow or another type of rigorous flow of gas generated through rigorous mixing, spinning, stirring, or rotating. The process 500 may begin at block 502 where the air conditioning device 100 receives input air and causes the received input air to rigorously move and/or vortically rotate. At block 504 the air conditioning device 100 receives input liquid. The air conditioning device 100, at block 506, charges liquid droplets of the input liquid. At block 508, the air conditioning device 100 sprays or otherwise releases the charged liquid droplets into vortically rotating (or otherwise rigorously moving) airflow causing the charged liquid droplets to attract vapor molecules present in the input air. The air conditioning device 100, at block 510, causes the liquid droplets with the attached vapor molecules to condense and collect as liquid. At block 512, the air conditioning device 100 recirculates the combined droplets to be charged and released into the vortically rotating (or otherwise rigorously moving) airstream. At block 514, the air conditioning device 100 outputs the output air having a first humidity less than a second humidity of the input air and having a first temperature lower (i.e., being colder) than a second temperature of the input air. While the process 500 illustrates the output air having a lower temperature than the input air, the system and process of the present disclosure is not so limited. For example, respective temperatures of the input air and the output air may be equal.

The rotational vortical flows of the air conditioning device 100 facilitates energy-efficient dehumidifying and cooling scaled to residential and light commercial interior HVAC applications. In an example, multiple air conditioning devices 100 may be installed within a given air duct system. In another example, the air conditioning device 100 may replace a 90-degree bend to limit pressure losses. The air conditioning device 100 may be configured to run on the outdoor air, which is typically 10% (minimum outdoor air) to 40% (high air changed per hour) of the total supplied air flow to the building. In a given HVAC application, the air conditioning device 100 may include more or fewer electrosprays, equally or unequally distributed along the walls of the mixing chamber. The air conditioning device 100 performance may be further modified to desirable operation by at least one of adopting larger mixing chambers and connecting the air conditioning device 100 in series and in parallel with respect to the outdoor air flow intake.

The air conditioning device 100 may be configured to decrease the relative humidity by as much as 30%. Such a reduction in humidity may eliminate completely the latent loads in some climate zones. A number of charged droplets in a single electrospray emitter may be about 7 droplets/sec for 1 cfm to 2 cfm of air and may result in a dehumidification of 2.4% R.H. To achieve 5% dehumidification, about 46 droplets/sec for 5 cfm air may need to be delivered. For accommodating an airflow of 200 cfm and producing 10% dehumidification, a rate of charged droplets may need to be 4,000 droplets/sec or greater. A commercial embodiment of the air conditioning device 100 may include electrospray systems that deploy over 25,000 charged droplets/sec in the rotating air flows. Likewise, implementations of the air conditioning device 100 may include multiple electrosprays, distributed and multi-stage approaches and so on.

Advantages of the air conditioning device of the present disclosure include eliminating a need to generate high electrostatic field to push the charged droplets across the airflow, eliminating a need for condensation walls necessary in the existing water harvesting technology, as well as, a need for regeneration technology. The air conditioning device does not create undesirable odors. Indeed, electrostatic droplets may be used to clean dust, smoke, and others odors from the air. Further, the air conditioning device 100 is not vulnerable to corrosion. Notably, the air conditioning device 100 does not consume water and the water droplets extracted from the air are reused in the electrospray, resulting in net amount of potable water generated from the air. The air conditioning device of the present disclosure can be made of inexpensive non-toxic materials and provides excellent part-load performance in view of readily available fast and modular electrospray technology. The air conditioning device is lighter than enthalpy wheels used for heat exchanging in some HVAC implementations. The air conditioning device 100 may be easy to integrate as an add-on component in air conditioning devices for retrofitting SSLC A/C systems and/or may be adapted to connect to high voltage amplifiers used in ultraviolet (UV) systems of some air conditioning devices.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. An air conditioning device comprising:
a body comprising:
an inlet plenum portion configured to receive input air including vapor molecules;
a spray chamber portion operatively connected with the inlet plenum portion and configured to receive the input air therefrom, wherein the received input air is rigorously mixed within the spray chamber;
a sprayer portion configured to charge at least one of a plurality of liquid droplets generating at least one charged liquid droplet, wherein the sprayer portion is operatively connected with the spray chamber portion and is configured to release the charged liquid droplet into the rigorously mixed air to cause the charged liquid droplet to attract at least one vapor molecule, such that the at least one vapor molecule attaches to the charged liquid droplet and separates from the input air;
a separation chamber portion operatively coupled to the spray chamber portion and an outlet plenum portion, wherein the separation chamber portion causes the liquid droplet with the attached vapor molecule to separate from the rigorously mixed air and to condense and collect as liquid within the outlet plenum, wherein the outlet plenum portion is configured to drain the collected liquid, and wherein the liquid is recirculated to the sprayer portion to be charged and released into the rigorously mixed air; and
an air outlet portion operatively coupled to the separation chamber and configured to direct output air away from the air conditioning device, wherein the output air includes air remaining following the separation, from the rigorously mixed air, of the liquid droplet with the attached vapor molecule, and wherein a first humidity of the output air is less than a second humidity of the input air.

2. The device of claim 1, wherein rigorously mixing the input air comprises generating a vortical flow of the input air.

3. The device of claim 1, wherein the liquid droplet includes water, and wherein the sprayer portion includes a high-voltage electrode configured to charge the liquid droplet.

4. The device of claim 1, wherein each of the spray chamber portion, the separation chamber portion, and the air outlet portion comprise a hollow cylinder, and wherein the air outlet portion is disposed within and concentrically with the spray chamber portion and the separation chamber portion interconnected with one another.

5. The device of claim 4, wherein respective sidewalls of the air outlet portion and the spray chamber portion define a passage therebetween, and wherein rigorous mixing of the input air causes the received input air to move within the passage.

6. A method for operating an air conditioning device, the method comprising:
receiving input air including vapor molecules and moving the received input air in an air rotating vortex;
charging at least one of a plurality of liquid droplets to generate at least one charged liquid droplet;

releasing the charged liquid droplet into the air rotating vortex to cause the charged liquid droplet to attract at least one vapor molecule, such that the at least one vapor molecule attaches to the charged liquid droplet and separates from the input air;

causing the liquid droplet with the attached vapor molecule to separate from the air rotating vortex and to condense and collect within an outlet plenum;

draining the collected liquid, and recirculating the drained liquid to be charged and released into the air rotating vortex; and directing output air away from the air conditioning device, wherein the output air includes air remaining following the separation, from the air rotating vortex, of the liquid droplet with the attached vapor molecule, and wherein a first humidity of the output air is less than a second humidity of the input air.

7. The method of claim 6, wherein a first temperature of the output air is less than a second temperature of the input air.

8. The method of claim 6, wherein the liquid droplets include water, and wherein charging of the liquid droplet is performed using a high-voltage electrode.

9. The method of claim 6, wherein the air rotating vortex moves the received input air within a passage.

10. An air conditioning device comprising:
a spray chamber configured to receive input air including vapor molecules, wherein an air rotating vortex within the spray chamber moves the received input air;
an electrospray configured to charge liquid droplets and release the charged liquid droplets into the air rotating vortex causing the charged liquid droplet to attract at least one vapor molecule, such that the at least one vapor molecule attaches to the charged liquid droplet, wherein sidewalls of the spray chamber define a plurality of apertures, each aperture configured to receive a spray nozzle that protrudes into the spray chamber, and wherein the electrospray releases the charged liquid droplet into the air rotating vortex within the spray chamber using the spray nozzles;
a separation chamber configured to cause the liquid droplet with the attached vapor molecule to separate from the air rotating vortex and to condense and collect as liquid within an outlet plenum; and
an air outlet configured to direct output air away from the air conditioning device, wherein the output air includes air remaining following the separation, and wherein at least one of (i) a first humidity of the output air is less than a second humidity of the input air and (ii) a first temperature of the output air is less than a second temperature of the input air.

11. The air conditioning device of claim 10, wherein the charged liquid droplets are charged to a Rayleigh limit.

12. The air conditioning device of claim 10, wherein the charged liquid droplet generates a gradient electric field, and wherein the charged liquid droplet attracts the at least one vapor molecule when the at least one vapor molecule is within the gradient electric field.

13. The air conditioning device of claim 12, wherein the attracting of the at least one vapor molecule causes the at least one vapor molecule to move toward a surface of the charged liquid droplet generating a gradient of vapor concentration surrounding the charged liquid droplet.

14. The air conditioning device of claim 13, wherein a nucleation occurs in response to a density of the vapor concentration being greater than a predefined saturation.

15. The air conditioning device of claim 14, wherein the nucleation is caused by additional electrical energy transferred to the charged droplets by the electrospray, and wherein the nucleation comprises a net condensation of the vapor molecules in the air rotating vortex within the spray chamber.

16. The air conditioning device of claim 14, wherein the nucleation and growth of the charged liquid droplet deplete a vapor phase near that charged liquid droplet causing an equilibrium to shift toward condensation.

17. An air conditioning device comprising:
a spray chamber configured to receive input air including vapor molecules, wherein an air rotating vortex within the spray chamber moves the received input air;
an electrospray configured to charge liquid droplets and release the charged liquid droplets into the air rotating vortex causing the charged liquid droplet to attract at least one vapor molecule, such that the at least one vapor molecule attaches to the charged liquid droplet
a separation chamber configured to cause the liquid droplet with the attached vapor molecule to separate from the air rotating vortex and to condense and collect as liquid within an outlet plenum, wherein the collected liquid is recirculated to the electrospray to be charged and released into the air rotating vortex; and
an air outlet configured to direct output air away from the air conditioning device, wherein the output air includes air remaining following the separation, and wherein at least one of (i) a first humidity of the output air is less than a second humidity of the input air and (ii) a first temperature of the output air is less than a second temperature of the input air.

* * * * *

UNITED STATES PATENT AND TRADEMARK OFFICE
CERTIFICATE OF CORRECTION

| | | |
|---|---|---|
| PATENT NO. | : 11,358,094 B2 | Page 1 of 1 |
| APPLICATION NO. | : 17/034344 | |
| DATED | : June 14, 2022 | |
| INVENTOR(S) | : Lorenzo Cremaschi | |

It is certified that error appears in the above-identified patent and that said Letters Patent is hereby corrected as shown below:

In the Specification

In Column 1, Line 12, please insert the following:
-- GOVERNMENT RIGHTS
This invention was made with government support under DE-EE0009161 awarded by the US Department of Energy (DOE). The government has certain rights in the invention. --

Signed and Sealed this
Thirteenth Day of May, 2025

Coke Morgan Stewart
*Acting Director of the United States Patent and Trademark Office*